Figure 1:
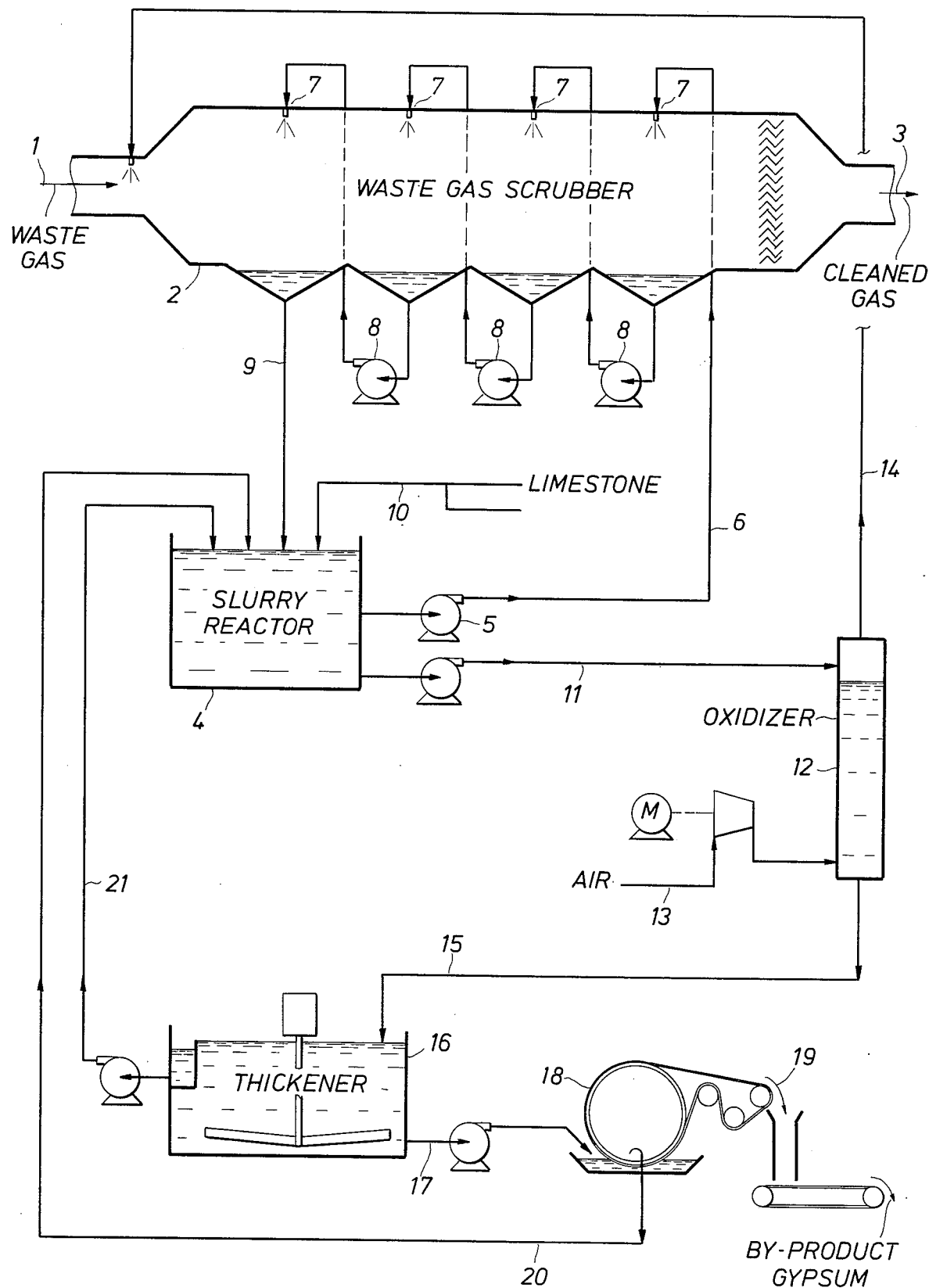

United States Patent [19]

Mandelik et al.

[11] 3,985,860

[45] Oct. 12, 1976

[54] METHOD FOR OXIDATION OF $SO_2$ SCRUBBER SLUDGE

[75] Inventors: Bernard G. Mandelik; Walter A. Cronkright, both of Houston, Tex.

[73] Assignee: Pullman Incorporated, Chicago, Ill.

[22] Filed: Sept. 22, 1975

[21] Appl. No.: 615,454

[52] U.S. Cl. .............................. 423/242; 423/166; 423/555
[51] Int. Cl.² ......................................... C01B 17/00
[58] Field of Search ............ 423/242, 244, 166, 555

[56] References Cited
UNITED STATES PATENTS

| | | | |
|---|---|---|---|
| 3,808,321 | 4/1974 | Fjkui et al. .......................... | 423/242 |
| 3,883,639 | 5/1975 | Cronkright et al. ................. | 423/166 |
| 3,914,378 | 10/1975 | Selmeozi ............................. | 423/242 |

*Primary Examiner*—Earl C. Thomas
*Assistant Examiner*—Gregory A. Heller

[57] ABSTRACT

This process provides for the oxidation of calcium sulfite produced from wet scrubbing sulfur oxides to gypsum in an aqueous medium containing magnesium sulfate. The process renders scrubber sludge filterable for further manufacturing use or disposal without use of acidic streams.

9 Claims, 2 Drawing Figures

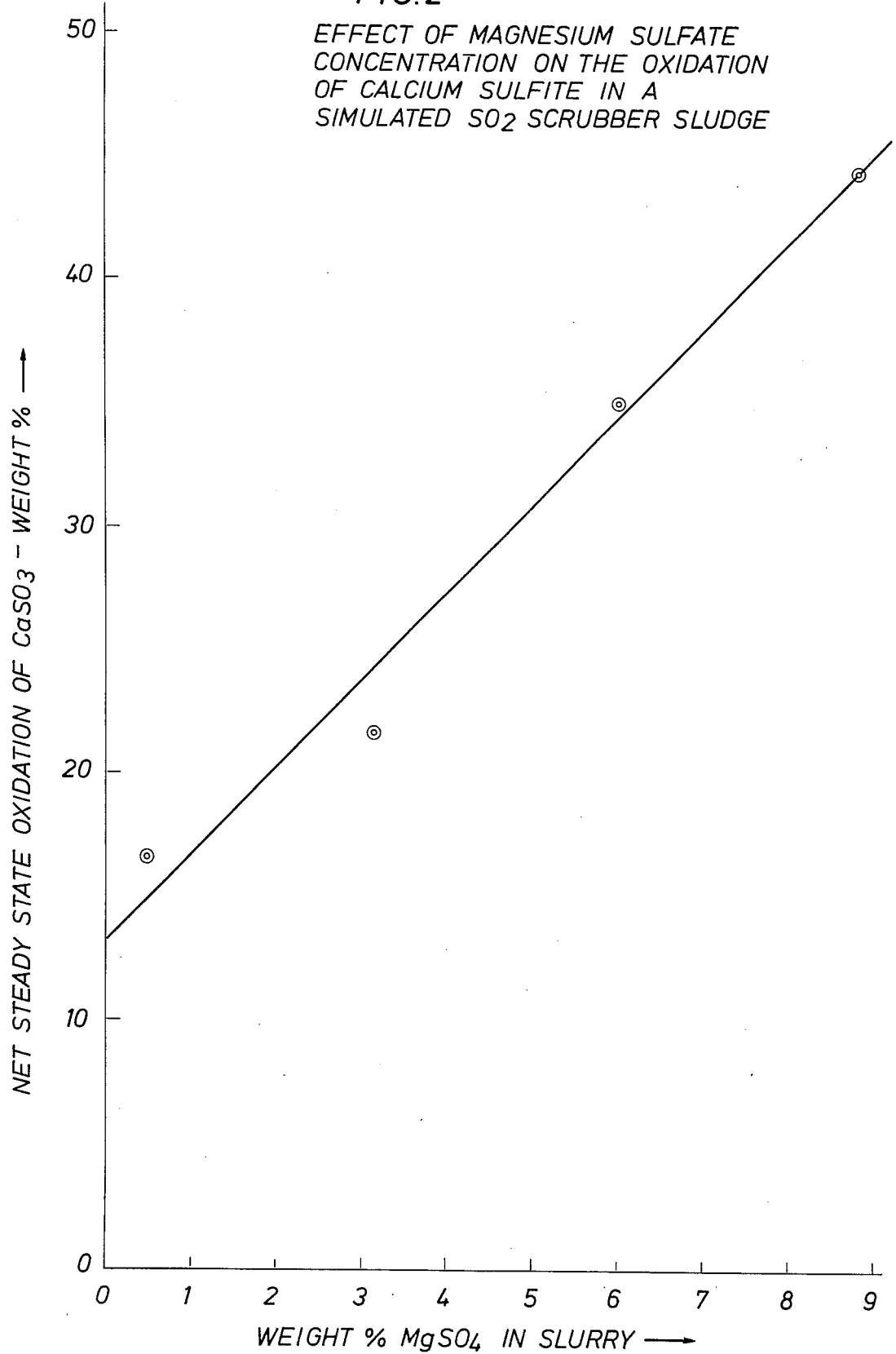

METHOD FOR OXIDATION OF SO₂ SCRUBBER SLUDGE

This invention relates to a process for the removal of sulfur oxides from industrial waste gases by wet scrubbing wherein calcium sulfite is formed and subsequently oxidized to calcium sulfate for manufacturing use or disposal.

Oxides of sulfur such as sulfur dioxide and sulfur trioxide are components of many commercial effluents such as the effluent gas from coal or oil-fired electric power plants, furnace exhausts, smelter gases, and various other chemical and petroleum operations. In view of the noxious effect of sulfur oxides on the environment, many processes have been developed for their removal from waste gas discharges to the atmosphere.

Presently, the most highly commercialized processes for waste gas cleaning involve scrubbing sulfur oxides from the waste gas with aqueous systems involving the reaction of lime or limestone with sulfur oxides in the scrubber circulating loop as in conventional limestone processes or in a separate reaction loop as in the double alkali processes.

These processes form both calcium sulfite and calcium sulfate precipitates in a ratio that is controlled in large measure by the ratio of oxygen to sulfur dioxide contained in the flue gas. Unfortunately, these compounds often precipitate as a slime due to entrapement of water in the calcium sulfite crystals. In order to overcome this problem, scrubber operators attempt to oxidize as much calcium sulfite to the sulfate as possible, generally through air blowing the scrubber liquid in a delay tank or separate oxidizer interposed in the scrubber liquid circulating loop as described in U.S. Pat. No. 2,080,779 to Lessing. Alternatively, an oxidizer may be placed in the by-product bleed stream of the scrubber loop in instances where calcium sulfite is not detrimental to operation of the scrubber. When, as previously noted, oxygen level in the waste gas is relatively low with respect to the amount of SO₂ present, the quantity of calcium sulfite formed is greater than the mass transfer rate-limited amount that can be economically oxidized in the aforementioned conventional systems. Slime precipitates result and the problem of disposal of a slimy sludge prevails.

Recently developed techniques to improve the rate of oxidation are based on the knowledge that low pH accelerates the conversion of calcium sulfite to calcium sulfate. This necessitates careful separation of the scrubber loop from the oxidation stream, however, since the scrubbing reactions are enhanced by relatively high pH. While systems based on this technique are effective with respect to the by-production of gypsum for further manufacturing uses or disposal, they suffer the disadvantage of carrying out oxidation at low pH with attendant problems of corrosion, sensitive control of operating conditions, and high capital cost of an additional acid scrubber loop or strong acid purchases required to satisfy the low pH requirements.

An object of this invention is to provide a process for the removal of sulfur oxides from waste gases wherein calcium sulfite by-product of a wet scrubbing operation may be economically oxidized to gypsum which is easily filtered for convenient disposal or further manufacturing processes without the necessity of operation under acid conditions.

Other objects and advantages of this invention will be apparent to those skilled in the art from the following description.

According to the invention, a process is provided for the oxidation of calcium sulfite produced for wet scrubbing sulfur oxides to calcium sulfate dihydrate by carrying out such oxidation in an aqueous medium containing at least 3 weight percent magnesium sulfate. Such process provides the advantage of rendering scrubber sludge filterable for further use or disposal without requiring employment of acidic streams.

The waste gases treated by the process of this invention are those discussed in the introductory portion of this disclosure. These gases contain between about 0.03 and 10 weight percent sulfur predominantly in the form of sulfur dioxide and usually contain between about 50 and about 90 weight percent nitrogen and between about 0.1 and about 20 weight percent oxygen. When the gas is obtained from combustion sources, some solids such as fly ash and soot are also present.

Sulfur dioxide is removed from these waste gases by scrubbing with water containing a reactant which simultaneously or subsequently results in the by-production of calcium sulfite as well as calcium sulfate. This wet scrubbing may be carried out in various types of apparatus including venturi scrubbers, packed towers, spray towers and the like but is very effectively carried out in a horizontally disposed, multi-stage, spray type scrubber of the type shown in FIG. 1.

The scrubbing medium will usually comprise an aqueous solution or slurry containing lime or limestone or mixtures thereof as reactants with sulfur dioxide to produce calcium sulfite and calcium sulfate. Typically, the scrubbing medium is circulated through a scrubber loop consisting of the scrubber, a delay tank or slurry reactor which provides additional residence time for reactions, pump, and associated piping. The scrubber loop may also be several parallel circulating loops serving individual stages of a multi-stage scrubber. In this instance, each circulating loop will usually utilize an individual slurry reactor. The scrubbing reactions in these types of systems may be considerably accelerated by incorporation of soluble sulfates in the scrubbing medium in accordance with the teachings of U.S. Pat. No. 3,883,639.

The scrubbing medium may also be sodium carbonate or other compounds characteristic of the double alkali scrubbing systems. In these systems, alkali metal sulfites such as sodium sulfite are formed in the scrubber loop. The alkali metal sulfite is subsequently reacted with lime or limestone to regenerate the scrubbing medium with concomitant by-product production of calcium sulfite and gypsum.

As previously mentioned, the ratio of calcium sulfite to calcium sulfate formed in processes involving use of lime or limestone is largely dependent on the ratio of oxygen to sulfur dioxide present in the waste gas. In conventional lime/limestone systems operating, for example, on coal-fired power plant flue gases, if SO₂ content of the waste flue gas is in the relatively low order of 0.02 volume percent and oxygen level in the flue gas is in the relatively high range of 5 volume percent, substantially all of the calcium sulfite formed in the scrubber loop will be quickly oxidized in the scrubber by oxygen in the flue gas and very little calcium sulfite will be found in solids removed from the scrubber loop. In the more typical case, however, substantial amounts of calcium sulfite will be formed when the volume ratio of oxygen to sulfur dioxide present in the waste gas is less than about 125 to 1.0.

Most of the reactions between sulfur compounds and lime or limestone will take place in the first aqueous medium of the scrubber loop or in a separate circulating loop provided especially for these reactions as in the double-alkali process.

In present commercial practice there is little incentive to oxidize calcium sulfite in the scrubber loop in which a first aqueous medium circulates beyond that which occurs from oxygen in the flue gas. Oxidation is more economically performed on the slurry disposal stream, hereinafter second aqueous medium, which is taken from the scrubber loop. Forward flow in this stream will be a minor fraction up to about 15 percent of the total circulating flow rate of first aqueous medium.

The second aqueous medium contains in addition to water, calcium sulfite, calcium sulfate, and some unreacted calcium carbonate and/or lime. According to the present invention the second aqueous medium also contains at least about three weight percent magnesium sulfate calculated as the anhydrous salt. The magnesium sulfate may be added to the second aqueous medium at any convenient point ahead of the oxidizer. Alternatively, other magnesium compounds such as the oxide, carbonate, and hydroxide that are readily converted to magnesium sulfate by exposure to $SO_2$ and oxygen in the waste gas may be added to the process. Preferably in lime/limestone systems, the magnesium sulfate is added to the first aqueous medium of the scrubber loop where it will have the additional beneficial effect of enhancing performance of the lime or limestone scrubbers. In this case, the second aqueous medium is a minor portion of the first aqueous medium containing from about 5 weight percent to about 27 weight percent magnesium sulfate.

The second aqueous medium containing magnesium sulfate is then passed to an oxidation zone for conversion of at least a part of the calcium sulfite to calcium sulfate dihydrate. pH of the second aqueous medium will normally be in the range of from about 5 to about 8 as a result of the reaction of lime and/or limestone with sulfur compounds. While oxidation of $CaSO_3$ does not require maintenance of this pH range, no additional advantage is obtained by operating at a lower range and the addition of acids is undesirable from the viewpoint of corrosion and additional investment and operating costs.

The oxidation zone is a gas-liquid mixing apparatus of a type known to those skilled in the art and may be a tower with internal mixing trays or a vessel or tower equipped with spargers or atomizing devices. Preferably, air is utilized as the oxidizing agent and is supplied to the oxidation zone at above atmospheric pressure and with a partial pressure of oxygen of from about 2 to about 100 psia. Most preferably, air will be supplied at a pressure of from about 10 psig. to about 100 psig. and at a superficial velocity within the oxidation zone of from about 0.1 feet per second to about 1.0 feet per second.

Since the magnesium sulfate ion pair $MgSO_4°$ contained in the aqueous medium of the stream to be oxidized reacts with calcium sulfite to form calcium sulfate dihydrate and the soluble ion pair $MgSO_3°$, the mass transfer resistance caused by slow dissolution of $CaSO_3$ is no longer the rate limiting factor in $CaSO_3$ oxidation. The oxidation rate is now governed by the rate of oxygen addition which in turn, is a function of the oxygen partial pressure. $MgSO_3°$ formed by dissolution of calcium sulfite is simultaneously oxidized back to the neutral ion pair $MgSO_4°$ and remains dissolved in the aqueous medium.

Slurry from the oxidizing zone will normally be passed to a clarifier or settler where overflow is recycled to the scrubber loop and the thickened slurry, now enriched in gypsum is pumped to a filtration zone for removal of solids.

This invention is more fully illustrated in FIG. 1, which shows diagrammatically a preferred embodiment thereof.

Referring now to FIG. 1, industrial waste gas containing 0.03 volume percent sulfur dioxide and 5 volume percent oxygen is passed 1 to a spray type, horizontal, multi-stage scrubber 2 and cleaned gas exits 3 the scrubber for passage to an exhaust stack. A first aqueous medium having a pH of 5.6 and comprising calcium carbonate, calcium sulfite, calcium sulfate, and 9 weight percent magnesium sulfate circulates through the scrubber loop via slurry reactor 4, pump 5, line 6, sprays 7, stage pumps 8, and return line 9. Calcium carbonate in the form of limestone and in amount sufficient for the sulfur reactions is added through line 10 to the slurry reactor 4 along with sufficient magnesium sulfate required to make up the normally slight loss of magnesium sulfate from the process. Concentration of calcium carbonate as well as pH of the aqueous medium will be lower in line 9 than in line 6 owing to the reactions of limestone and sulfur dioxide in the waste gas. The concentration of magnesium sulfate will remain relatively constant since it is not consumed in the scrubbing reactions.

A minor portion of the first aqueous medium is removed from the slurry reactor 4 through line 11 as the second aqueous medium and passed to oxidation zone 12. This stream contains 6.5 weight percent calcium sulfite, 1.5 weight percent calcium sulfate, 2 weight percent calcium carbonate, and 9 weight percent dissolved magnesium sulfate. The calcium compounds are, for the most part, in solid form.

Oxidation zone 12 is a vertical tower without internal packing or trays and is equipped with means for the addition of air at a pressure of 75 psig. from compressor 13. Oxygen-depleted air is removed from the tower and vented 14 to the scrubber 2. The second aqueous medium leaving the oxidation zone 12 contains only trace amounts of calcium sulfite, 10 weight percent calcium sulfate dihydrate, 2 weight percent calcium carbonate, and 9 weight percent dissolved magnesium sulfate and is passed 15 to slurry thickener 16. Total solids in the oxidized stream is now 12 weight percent which is higher than the unoxidized stream due to increased oxygen content and water of hydration in the gypsum crystals. Thickened slurry containing 40 weight percent solids is removed from a lower part of the thickener 16 and passed to rotary drum filter for separation of solids which are predominantly gypsum. Filtrate 20 from the drum filter and supernatant 21 from the thickener, both containing dissolved magnesium sulfate and some dissolved calcium compounds are recycled to the scrubber loop for further use. The solids by-product of the process has the following composition:

| | | |
|---|---|---|
| $CaSO_4 \cdot 2H_2O$ | = | 83% |
| $CaSO_3 \cdot \frac{1}{2}H_2O$ | = | 1% |
| $CaCO_3$ | = | 16% |

EXAMPLE

Oxidizer treatment of sludge from a limestone-based, $SO_2$ wet scrubbing system was simulated by adding limestone and sulfurous acid to a stirred, five liter vessel at a steady state rate equivalent to a commercial loading of 3 SCFM of $SO_2$ per 1000 gallons of reaction slurry. Air was bubbled through the reaction slurry containing $CaSO_3$, $CaSO_4$, and $CaCO_3$ at a rate equivalent to 30 SCFM per 1000 gallons of reaction slurry. Magnesium sulfate solutions of varying concentration were added to the reaction slurry under steady state conditions and at a fixed rate in order to control total suspended solids in the system at an arbitrary value of 10 weight percent.

Net oxidation of $CaSO_3$ was determined by measuring the sulfate sulfur and total sulfur content of the product solids and correcting for the amount of sulfate contributed by the added magnesium sulfate. Net oxidation expressed as a weight percent of sulfate sulfur with respect to total sulfur in the product solids is given for four levels of magnesium sulfate concentration in Table 1 below. These results are portrayed graphically in FIG. 2. The results show that oxidation of $CaSO_3$ in a simulated limestone reaction sludge is enhanced by the addition of magnesium sulfate.

TABLE 1

| $MgSO_4$ in Reaction Slurry (weight %) | Total Oxidation (weight %) | Net Oxidation (weight %) |
|---|---|---|
| 0.4 | 17.8 | 16.7 |
| 3.1 | 26.4 | 21.6 |
| 6.0 | 41.4 | 34.8 |
| 8.8 | 83.3 | 44.2 |

We claim:
1. In a process for removing sulfur oxides from industrial waste gas by contacting the waste gas with a first aqueous medium containing sodium carbonate, calcium hydroxide, or calcium carbonate and precipitating calcium sulfite as a by-product, the improvement which comprises oxidizing at least part of the precipitated calcium sulfite to calcium sulfate with an oxygen-containing gas at an oxygen partial pressure of from about 2 to about 100 psia in a second aqueous medium containing at least 3 weight percent magnesium sulfate.
2. The process of claim 1 wherein the first aqueous medium contains calcium hydroxide or calcium carbonate or mixtures thereof.
3. The process of claim 1 wherein the pH of the second aqueous medium is within a range of from about 5.0 to about 8.0.
4. The process of claim 1 wherein oxidation of said least part of the precipitated calcium sulfite is carried out under a partial pressure of oxygen from about 2 psia. to about 100 psia.
5. The process of claim 1 wherein the oxygen-containing gas is air which is passed through the second aqueous medium at a superficial velocity of from about 0.1 feet per second to about 1.0 feet per second and at a pressure of from about 10 psig. to about 100 psig.
6. The process of claim 2 wherein the second aqueous medium is a minor portion of the first aqueous medium.
7. The process of claim 2 wherein the second aqueous medium contains a minor portion of the first aqueous medium.
8. The process of claim 1 wherein oxygen and sulfur dioxide are present in the industrial waste gas at a concentration volume ratio of less than 125 to 1.0.
9. The process of claim 6 wherein the second aqueous medium contains magnesium sulfate in a concentration of from about 5 weight percent to about 27 weight percent.

* * * * *